(12) United States Patent
Sutta et al.

(10) Patent No.: US 10,898,777 B2
(45) Date of Patent: Jan. 26, 2021

(54) TRAINING DEVICE

(71) Applicants: Peters Sutta, Riga (LV); Janis Leitans, Riga (LV)

(72) Inventors: Peters Sutta, Riga (LV); Janis Leitans, Riga (LV)

(*) Notice: Subject to any disclaimer, the term of this patent is extended or adjusted under 35 U.S.C. 154(b) by 0 days.

(21) Appl. No.: 16/641,650

(22) PCT Filed: Aug. 18, 2018

(86) PCT No.: PCT/IB2018/055995
§ 371 (c)(1),
(2) Date: Feb. 25, 2020

(87) PCT Pub. No.: WO2019/048952
PCT Pub. Date: Mar. 14, 2019

(65) Prior Publication Data
US 2020/0246670 A1    Aug. 6, 2020

(30) Foreign Application Priority Data
Sep. 5, 2017  (LV) ........................................ P-17-54

(51) Int. Cl.
*A63B 69/36*    (2006.01)
*A63B 69/00*    (2006.01)

(52) U.S. Cl.
CPC .... *A63B 69/0024* (2013.01); *A63B 2225/093* (2013.01)

(58) Field of Classification Search
CPC ...................... A63B 69/0024; A63B 2225/093
USPC ............... 473/422, 439, 442, 446, 471, 478; 273/108, 108.1
See application file for complete search history.

(56) References Cited

U.S. PATENT DOCUMENTS

| | | | | |
|---|---|---|---|---|
| 2,103,428 A | * | 12/1937 | Lutes | A63B 63/00 273/127 B |
| 5,238,243 A | * | 8/1993 | Grispi | A63B 63/00 273/389 |
| 6,656,064 B2 | * | 12/2003 | Zielinski | A63B 69/0024 273/118 R |
| 10,668,347 B2 | * | 6/2020 | Bartels | A63B 69/0026 |
| 2006/0063615 A1 | * | 3/2006 | Richardson | A63B 63/007 473/446 |
| 2008/0248902 A1 | * | 10/2008 | Pittorf | A63B 69/0026 473/560 |
| 2017/0361190 A1 | * | 12/2017 | Del Monte | A63B 69/0026 |

* cited by examiner

*Primary Examiner* — Nini F Legesse
(74) *Attorney, Agent, or Firm* — Patshegen IP LLC; Moshe Pinchas

(57) ABSTRACT

The present invention generally relates to training devices used in the stick sports, particularly hockey, floorball and rural hockey, to improve users or corresponding stick sport players stick-handling abilities. A training device comprises at least three cross-members (10) that are connected to each other by means of support columns (20) and said connection is provided by means of a pin (30).

10 Claims, 10 Drawing Sheets

TRAINING DEVICE

The present invention relates to training devices used in the stick sports, particularly hockey, floorball and rural hockey, to improve users or corresponding stick sport players stick-handling abilities.

Hockey training device described in the U.S. Pat. No. 6,656,064 comprises a longitudinal bar construction that is elevated from the ground via support columns by a height sufficient to permit the free passage of the hockey puck. However, such construction is capable of limited configurations.

The above-mentioned problems have been overcome by a hockey training device, stated in the US patent application publication No. US 2008/0248902, that comprises the support columns and the cross-members based on them. The cross-members and the support columns are connected via the screw bolts. However, the assembly of such construction is a time-consuming process as well as during the exploitation screw connections become loose.

The objective of the present invention is to produce the training device which is easy to fabricate, assembly and disassembly.

The aim of the invention is being achieved by embodiment of the training device that comprises three members: the cross-member, the support column and the pin, and by connecting thereof, it is possible to form a series of the cross-members. Thus, producing a training device that contains as many stages as its user needs.

Training device comprises the cross-members, that act as junction members between the support columns. Cross-member is a flat bar or a suchlike element of a bar or a lever with an end opening formed at its each end. The end opening is a pass-through opening for receiving of the pin.

Moreover, the end groove of the cross-member, in which the end circumference of the support column upper part is inserted, is formed on that side of the cross-member, where it is based on the support column. Therefore, the cross-member is fixed to the support column. At least three ribs might be allocated along the circumference of the groove base for mating with the end circumference of the upper part of the support column. The ribs provide that in assembled position the support column is based on the ribs and the support column is maintained in a definite position with respect to the cross-member, thereby preventing these members from interdependent swinging.

The cross-member at its each end comprises the end opening. In turn, the end opening comprises a cylindrical protrusion or an annular flange with an end circumference. The cylindrical protrusion/flange is formed so that an annular step is formed on the inner surface of the cylindrical protrusion forming the cylindrical protrusion with two different diameters. Moreover, the end circumference of the cylindrical protrusion of another cross-member end opening may be supported on the annular step formed.

Moreover, the circular shaped end groove is concentric with the end opening of the cross-member. Respectively, in assembled condition the axis of the cross-member end opening is mating/in line with the central axis of the support column, and, in turn, the central axis/longitudinal axis of the pin is in line with the axes of the support column and the end opening of the cross-member.

The support column is formed so to connect and support the cross-members. The height/length of the support column depends on the use of the training device. The height of the support columns for the ice hockey training device is less than that of the support columns used in floorball or rural hockey draining devices. The height of the support column is so that, when in operation, a hockey puck or a floorball/rural hockey ball can freely pass underneath the elevated cross-members.

Moreover, the support column has elongated housing. Elongated housing might be cylinder-shaped, polygon-shaped or have alternative embodiments. The preferred shape of the elongated housing is cylinder. Elongated housing has a cross-wall arranged perpendicularly to the longitudinal direction of the support column. The cross-wall divides the support column into two parts. The main function of the support column is to hold the cross-wall opening for mating with the pin. Accordingly, the cross-wall opening is formed in the middle of the cross-wall, in order to receive, centre and mate with the pin. The cross-wall might be circular-shaped or have a bar-like design, whose main function is to hold the cross-wall opening in one line with the longitudinal axis of the support column.

The cross-wall opening of the support column has a cylindrical protrusion/an annular flange towards the longitudinal axis of the support column. Moreover, an annular step is formed on the inner surface of the cylindrical protrusion/flange, therefore forming a cylindrical protrusion with two different diameters. Similar principle of design is applied for the end of the cross-member. The annular step is formed so the end circumference of the cylindrical protrusion of the cross-member end opening can be based on the annular step.

Moreover, the cylindrical protrusion of the support column cross-wall opening is narrowed towards the end circumference, providing additional interference fit between the cross-wall opening and the pin. Furthermore, the end circumference of the cylindrical protrusion of the support column cross-wall opening might comprise additional flange/bead towards the centre of the opening, therefore providing additional interference fit between the opening of the support column and the pin.

The pins are formed so they can be embedded into each support column, therefore connecting the cross-member or cross-members and the support columns.

The pin comprises a core with a head of the pin at the one end and a free end at the other end thereof. At the free end of the core are sequentially arranged at least two annular snap-fitting beads formed so to pass through the cylindrical protrusion of the cross-member end opening and the cylindrical protrusion of the support column cross-wall opening in a snap-fit mode, creating a demountable snap-fit. The pin is made as a component part or a single-piece member.

The snap-fit ensures that the members, for example, the support column and the pin or the cross-member and the pin, connected via snap-fit are movable in one direction, but restricted in movement in the opposite direction. When the pin is connected with the cross-member and/or the support column, the snap-fit is formed between the snap-fitting beads of the pin and the cylindrical protrusion of the support column and/or the cross-member. As the above-mentioned members are made of elastic material, for example, plastics, under the influence of external forces at a certain deformation of the cylindrical protrusion and the pin, it is possible to demount the members of the snap-fit. Such kind of the connection facilitates the assembly, disassembly or reconfiguration of the training device.

The snap-fitting beads of the pin are shaped as cut cones with ends narrowed towards the free end of the core of the pin. Thus, the pins with the snap-fitting beads easily pass through the end openings of the cross-member and the openings of the support column cross-wall, however, the broad ends of the cut cones hit the end circumference of the cylindrical protrusion of the support column opening, thus restricting the movement in the opposite direction. Respectively, at the same time training device provides stable quality and ease of assembly.

Moreover, the formation of the longitudinal cut, which extends from the free end of the pin through the section of the core, where annular snap-fitting beads are located, makes the end of the pin more elastic and facilitates the assembly or disassembly of the pin.

The longitudinal cut of the pin at the free end of the pin comprises a cross-bar formed between two surfaces of the longitudinal cut and connecting thereof. The cross-bar provides additional rigidity to the free end of the pin, so that the first snap-fitting bead of the free end of the pin might provide sufficient interference fit.

The end circumference of the cylindrical protrusion of the cross-member end opening is protruded that far, that in assembled condition, when the end circumference is based on the annular step of the cylindrical protrusion of the support column, there is a gap between the cross-member and the support column. Moreover, the end circumference of the cylindrical protrusion of the cross-member end opening is protruded that far, that in assembled condition, when the end circumference is based on the bottom positioned annular step of the cylindrical protrusion of the support column, there is a gap between the upper and lower cross-member. In each case mutual rotation of the cross-members, with a rotation and support points at the end circumferences of the cylindrical protrusions thereof, is provided. As a result, other parts or surfaces of the cross-members are not being scratched or getting stuck into one another, thus providing unhindered rotation of the cross-member.

The cross-member, the support column and the pin are made of plastic and, in addition, each separately are made as a single-piece members.

The figures provided below give a detailed description of the invention.

FIG. 1 illustrates the training device, comprising three cross-members 10, four support columns 20 and pins 30 inserted therein.

Figure 3:
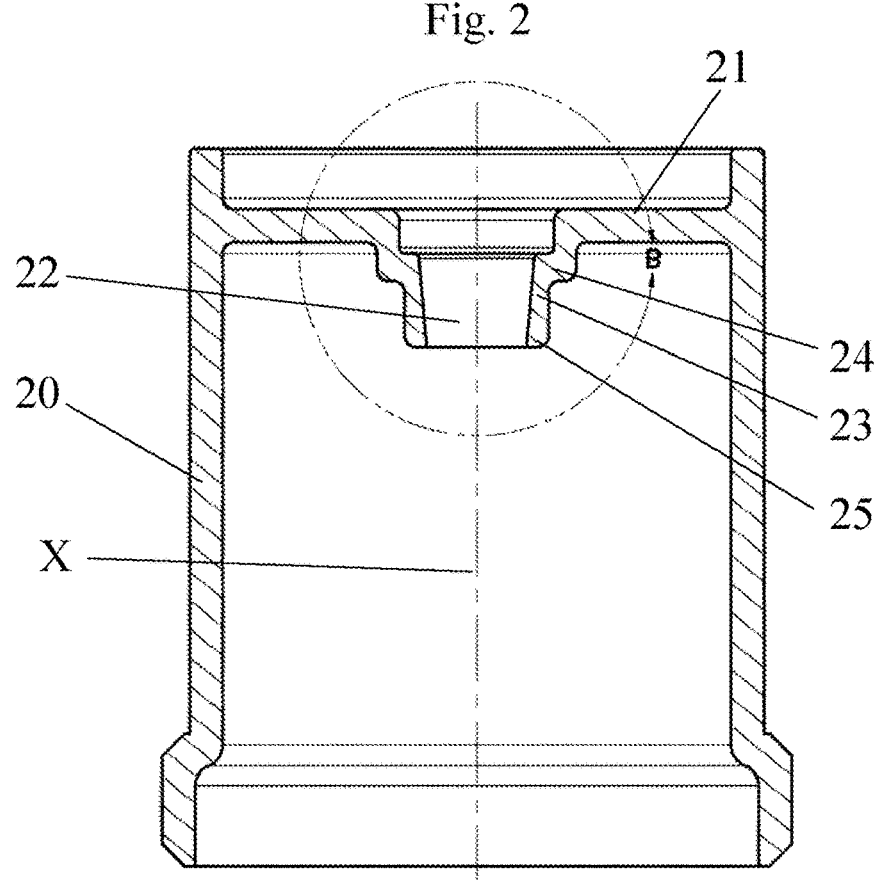
FIG. 3 illustrates a cross section of the support column 20.
Figure 4:
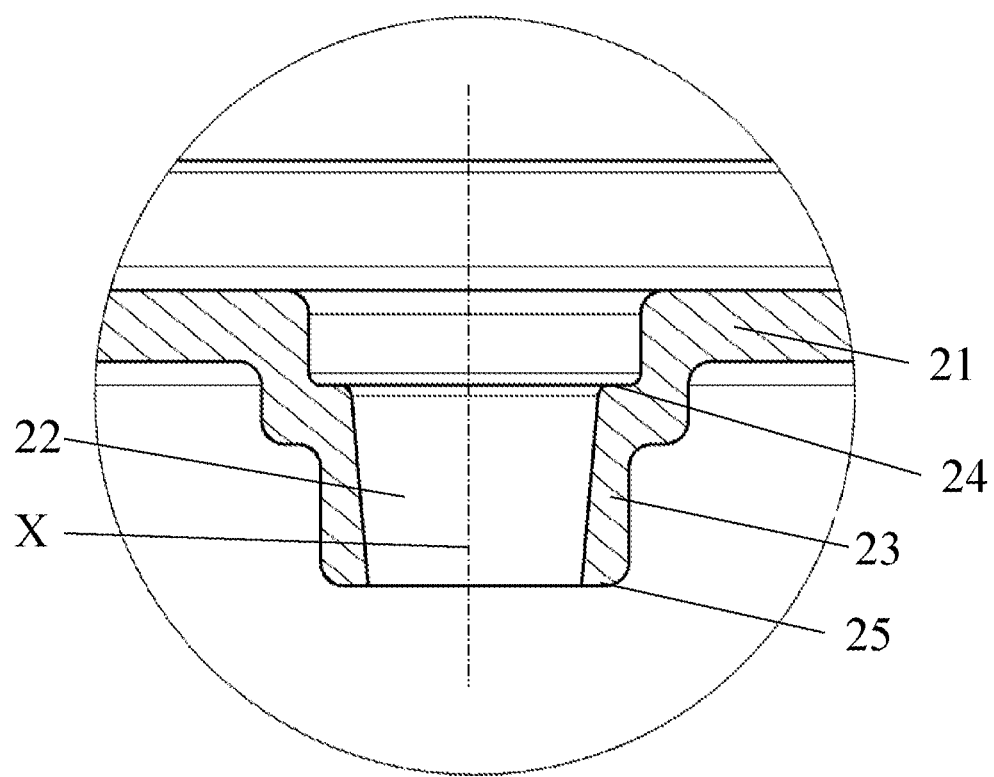

FIG. 4 illustrates an opening 22 of the support column 20 cross-wall 21 in close view from the support column cross section as seen in FIG. 3.

Figures 5, 6:
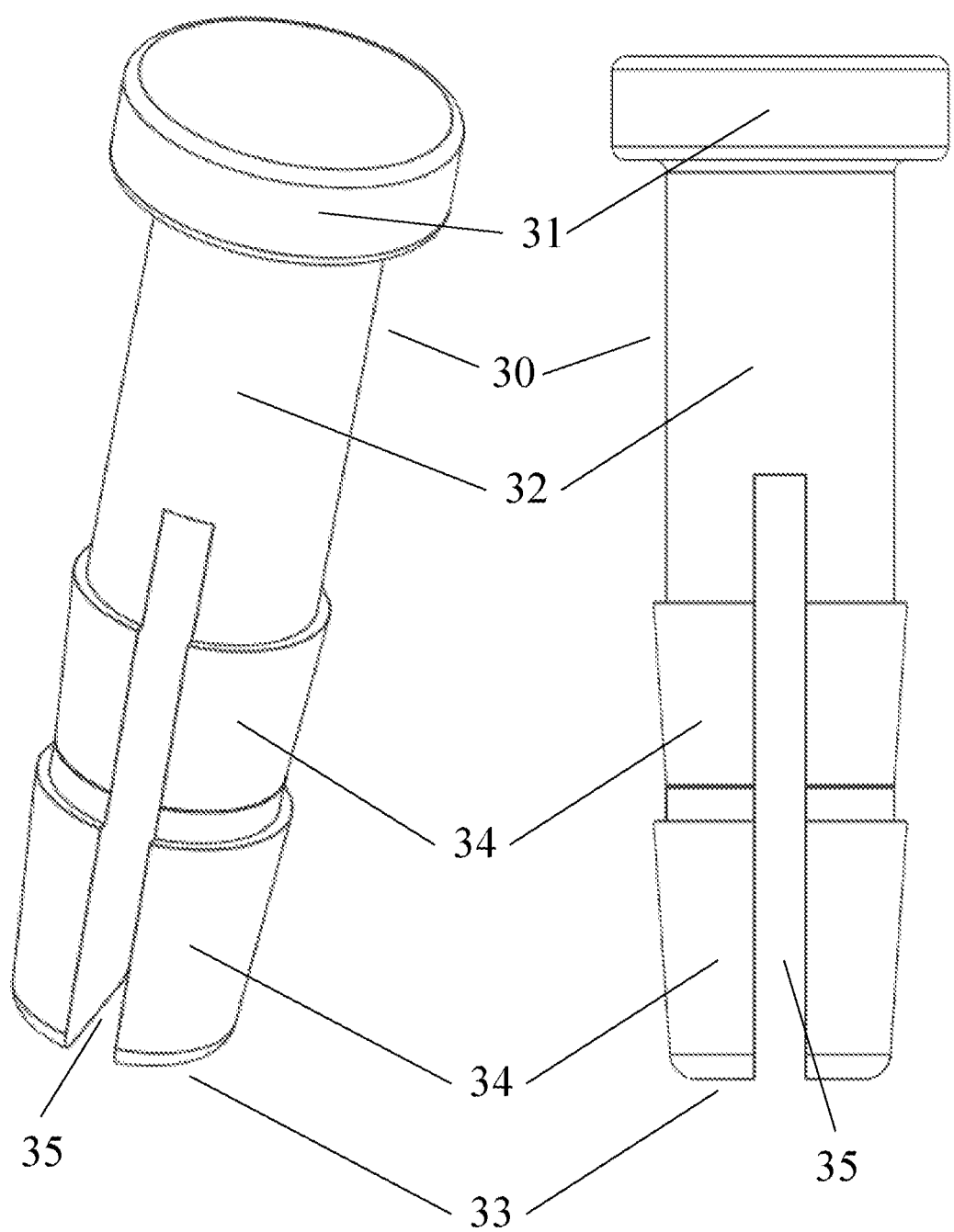

FIG. 5 illustrates axonometric projection of the pin 30.

FIG. 6 illustrates the side-view of the pin 30.

Figures 7, 8:
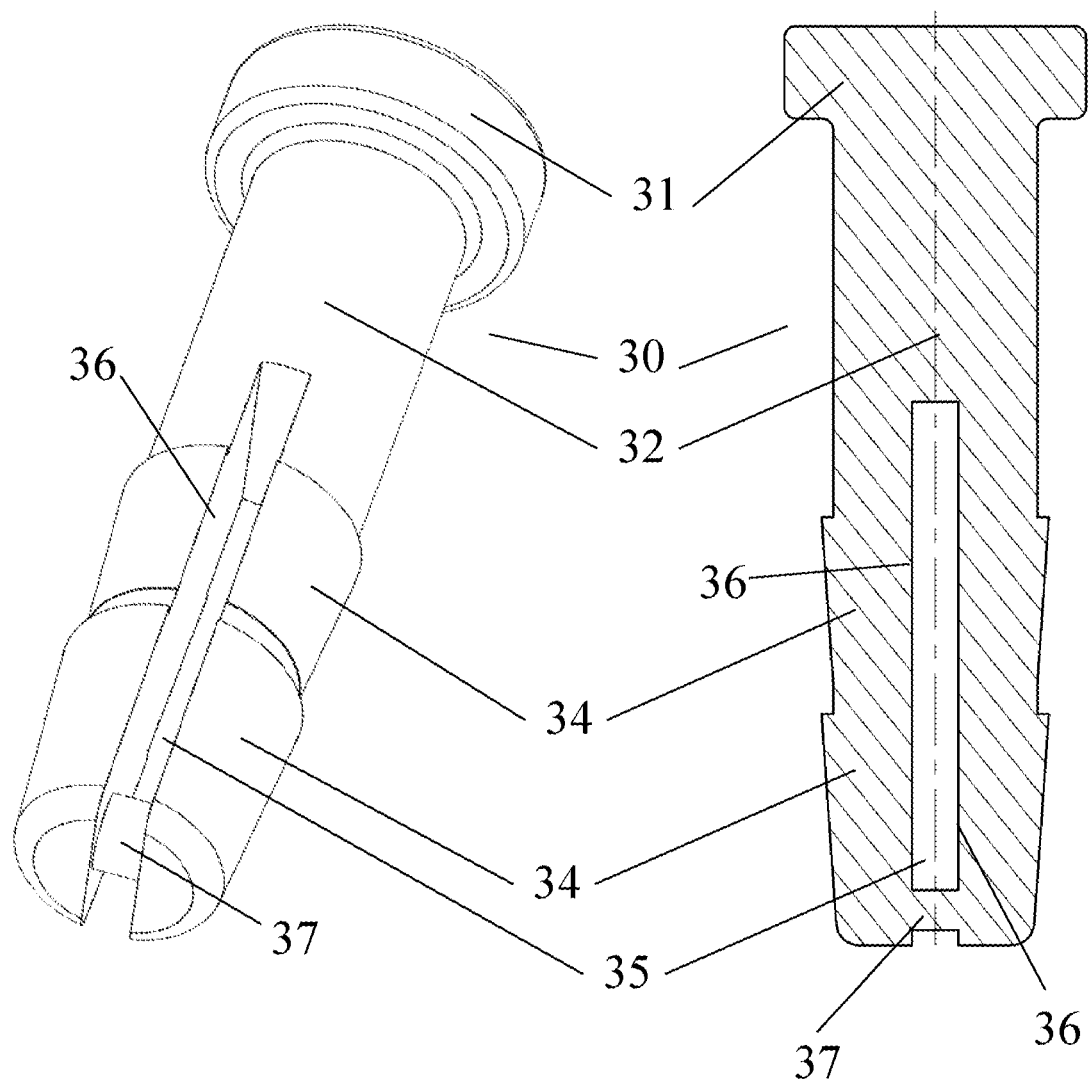

FIG. 7 illustrates the pin 30 with a cross-bar 37.

FIG. 8 illustrates the pin 30 in a cross section.

Figure 9:
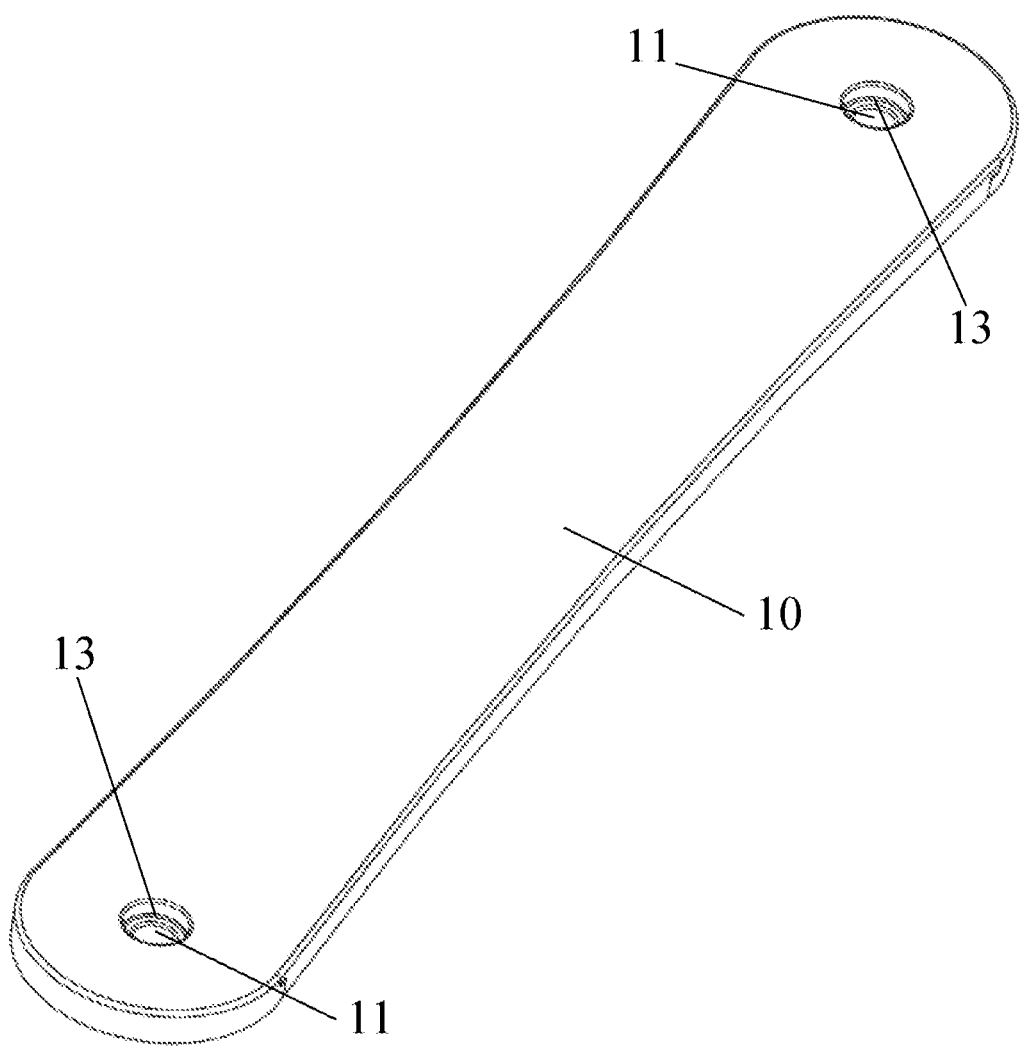

FIG. 9 illustrates the cross-member 10.

Figure 10:
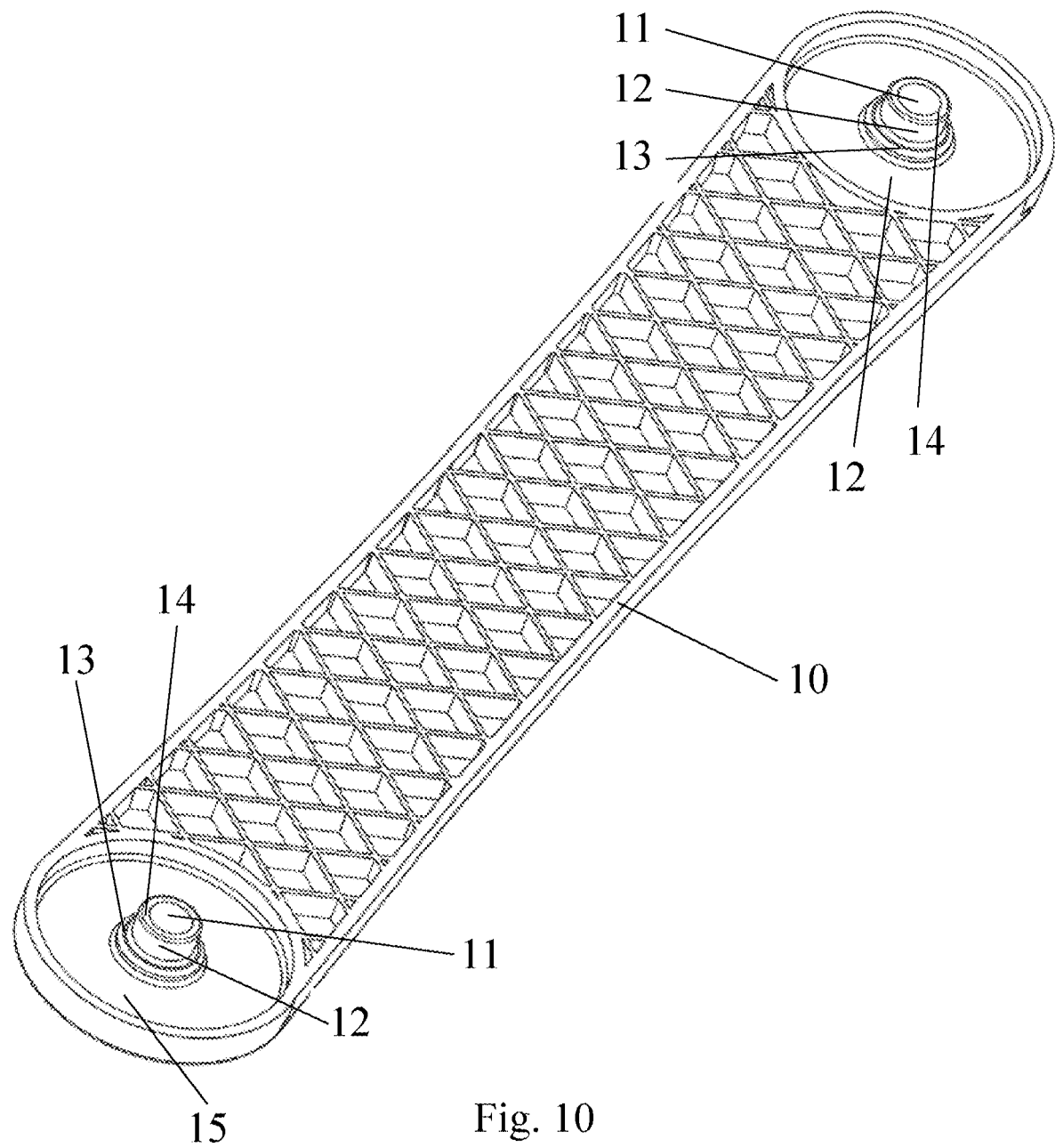

FIG. 10 illustrates a bottom view of the cross-member 10.

Figure 11:
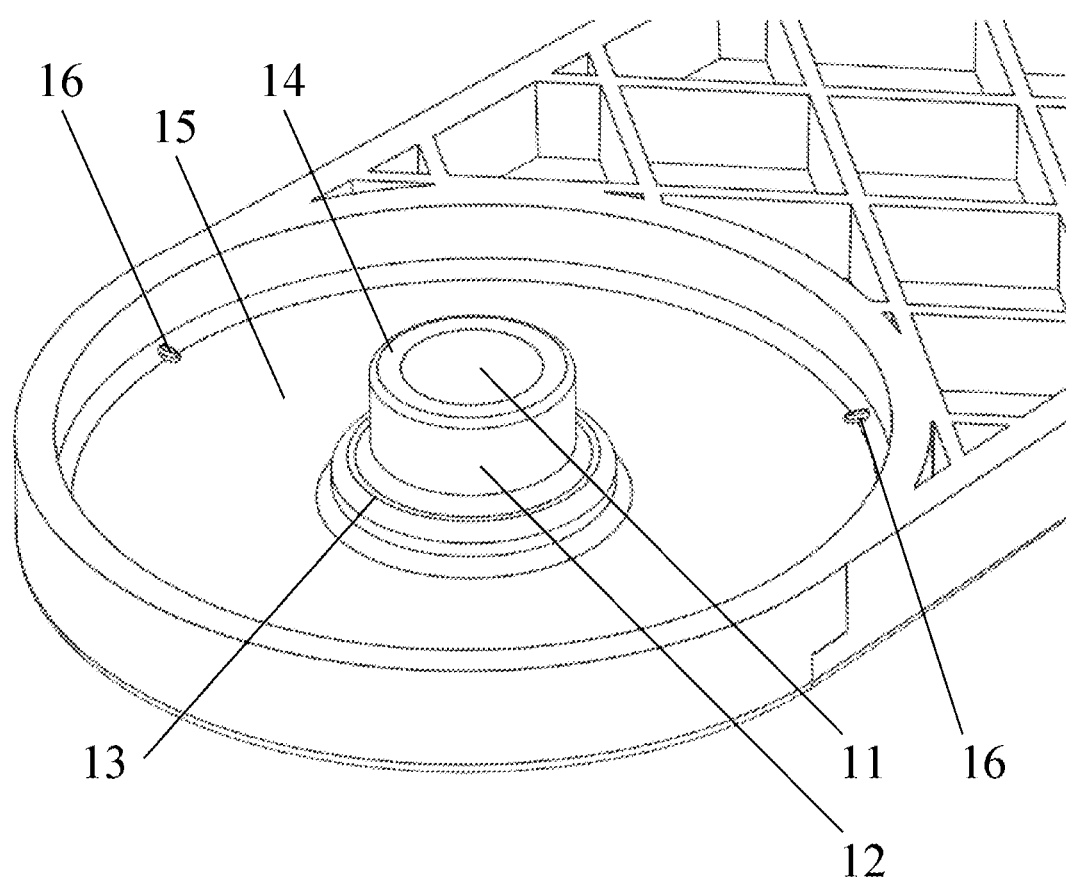

FIG. 11 illustrates an area around an end opening 11 of the cross-member 10.

Figure 12:
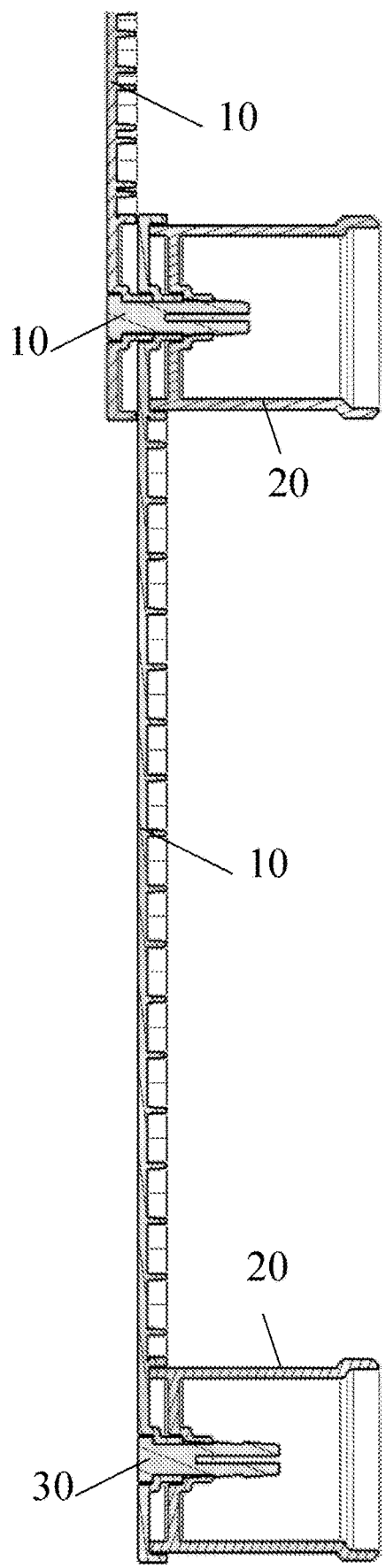

FIG. 12 illustrates a cross section of the segment of the training device comprising two cross-members 10, two support columns 20 and the pins 30 inserted therein.

Figure 13:
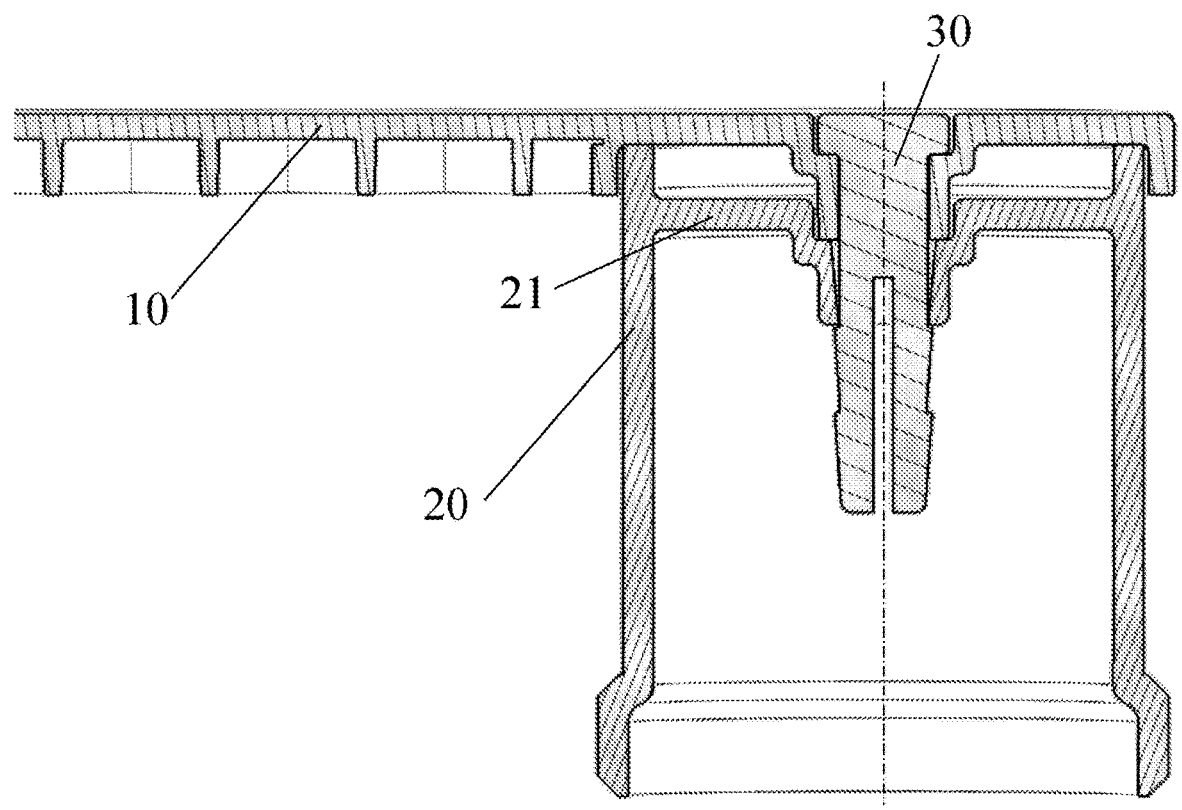

FIG. 13 illustrates the terminating segment of the training device comprising the support column 20 with a cross-member 10 and the pin 30 inserted therein.

Figure 14:
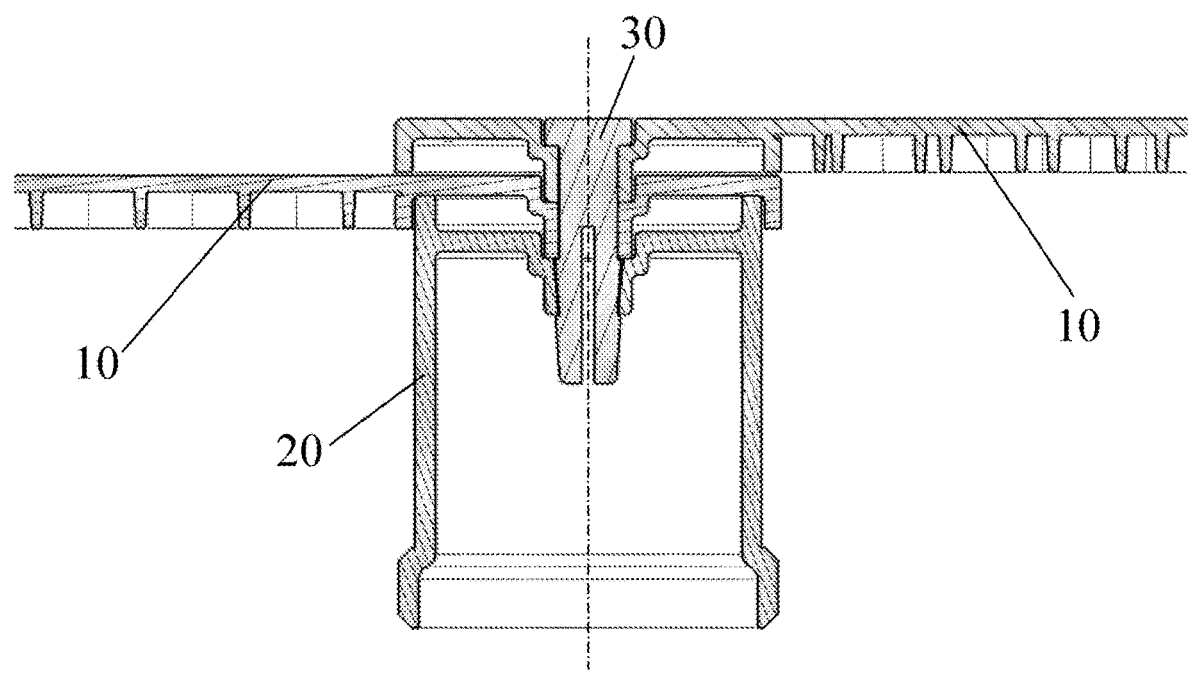

FIG. 14 illustrates the segment of the training device comprising two cross-members 10 elevated by one support column 20 and connected via the pin 30.

Figure 1:
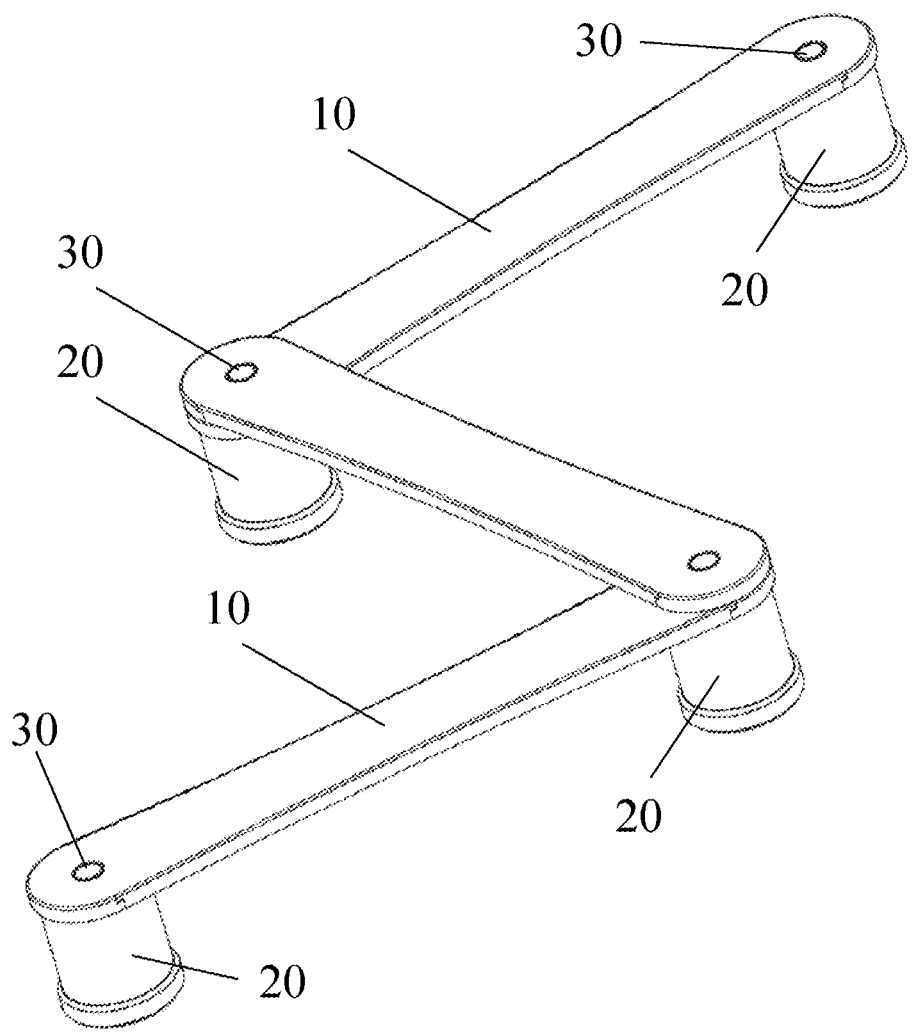

FIG. 1 illustrates the training device in assembled condition, comprising four cross-members 10, wherein a support column 20 is allocated at the end of each cross-member. The cross-member 10 is connected with the support column 20 by means of the pin 30. The pin 30 is connected with the support column 20 by means of the snap-fit.

Figure 2:
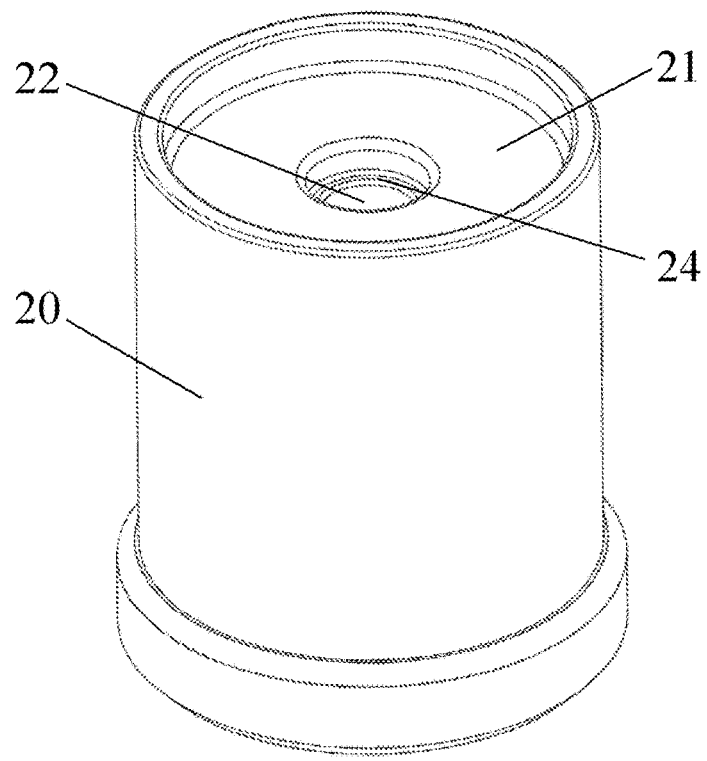
FIG. 2 illustrates a support column 20.

FIGS. 2 to 4 illustrate the cylinder-shaped support column 20. The support column at its upper part comprises a cross-wall 21 with a cross-wall opening 22 in the centre thereof, that has a cylindrical protrusion towards the centre and along the longitudinal axis X of the support column 20. In addition, the end circumference 14 of the cylindrical protrusion 12 of the cross-member 10 can be based on the annular step 24 formed on the cylindrical protrusion 23.

FIGS. 5 and 6 illustrate the pin 30 for the attachment of the cross-member 10 to the support column 20. The pin 30 comprises a core 32 with a head of the pin at the one end and a free end at the other end. At the free end of the core are sequentially arranged two annular snap-fitting beads shaped as cut cones with ends narrowed towards the free end of the pin. When the training device is in assembled condition, the snap-fitting beads are inserted in the cylindrical protrusion 23 of the opening of the support column 20. In order to facilitate the assembly and disassembly, the longitudinal cut 35, that extends from the free end 33 of the pin 30 through the annular snap-fitting beads 34 and slightly forward towards the head 31 of the pin 30, is formed in the core 32 of the pin 30.

FIGS. 7 and 8 illustrate the pin 30, that additionally comprises a cross-bar 37 formed between two surfaces 36 of the longitudinal cut 35, in order to improve the rigidity of the core 32 of the pin 30 in the area of the snap-fitting beads 34.

FIGS. 9 to 11 illustrate the cross-member 10 with the end openings 11 at its each end. The end opening 11, similarly to the end opening 22 of the support column 20, comprises a cylindrical protrusion 12 with an annular step 13. The above-mentioned cylindrical protrusion is formed so to mate with the cylindrical protrusion 23 of the support column, in particular, so that the end circumference 14 of the cross-member 10 cylindrical protrusion can be based on the annular step 24 of the cylindrical protrusion 23 of the support column 20. The cylindrical protrusion 12 of the cross-member 10 comprises an annular step 13 that is formed so the head 31 of the pin 30 or the end circumference 14 of the cylindrical protrusion 12 of the cross-member 10, in case, when two ends of the cross-elements 10 are allocated on the same support column 20 for mating, can be based thereon. Moreover, on the one side of the cross-member at its both ends at the area of the end opening 11 an annular groove, coaxial with the opening 11 and the cylindrical protrusion 12 thereof, if formed. The groove is formed in order to receive the upper part of the support column 20. FIG. 11 illustrates the groove 14 of the cross-member 10 that additionally comprises three ribs 16 allocated along the circumference. The ribs provide the support for the upper part of the support column 20 or the part thereof that is inserted into the cross-member 10, thus restricting the radial movement of the support column 20 while in mate with the cross-member 10.

FIGS. 12 to 14 illustrate the cross section of the part of the training device in assembled condition, in order to show in detail how the cross-member 10 mates with the support column 20 and the pin 30. FIG. 12 illustrates the cross section of the training device in assembled condition. FIG. 12 illustrates the end of the training device that begins with the support column 20 and the cross-member rotationally based thereon, and both members are connected by the means of the pin 30.

FIG. 13 illustrates in detail the rotational mating of the support column 20 with the single cross-member 10 via the pin 30. In turn, FIG. 14 illustrates the cross section of the intermediary area of the training device, wherein two ends of the cross-member 10 are based on the rotational mating of the support column 20 and connected by the means of the pin 30.

REFERENCES a cross-member 10;
a cross-member end opening 11;
a cylindrical protrusion of a cross-member 12;
an annular step of a cylindrical protrusion 13;
an end circumference of a cylindrical protrusion 14;
a deepening at an end of a cross-member 15;
a rib of a groove 16;
a support column 20;
a cross-wall of a support column 21;
a cross-wall opening 22;
a cylindrical protrusion of a cross-wall opening 23;
an annular step of a cylindrical protrusion 24;
an end circumference of a cylindrical protrusion 25;
a circumference of a support column upper end 26;
a pin 30;
a head of a pin 31;
a core of a pin 32;
a free end of a pin core 33;
a snap-fitting bead of a pin 34;
a longitudinal cut of a pin 35;
a surface of a longitudinal cut 36;
a cross-bar 37; and
a longitudinal axis of a support column X.

The invention claimed is:

1. A training device comprising:
   at least three cross-members each of which extending between two ends and having an end opening at each end of each of the cross-member;
   at least four support columns connecting and supporting the cross-members;
   a pin provided for each support column in order to connect the cross-member or cross-members to the corresponding support column,
   wherein each of the end openings of the cross-member comprises a cylindrical protrusion with an end circumference, and an annular step formed on the cylindrical protrusion such that the cylindrical protrusion has two different diameters, wherein the end circumference of the cylindrical protrusion of an end opening of one cross-member is supported on the annular step of the another cross-member;
   wherein the support column defines a longitudinal axis and comprises a cross-wall, arranged perpendicularly to the longitudinal axis, and a cross-wall opening defined at a center of the cross-wall and being configured to receive the pin;
   wherein the cross-wall opening of the support column has a cylindrical protrusion towards the longitudinal axis, wherein an annular step is formed on an inner surface of the cylindrical protrusion, forming a cylindrical protrusion with two different diameters, wherein the end circumference of the cylindrical protrusion of the cross-member end opening is supported on the annular step of the support column; and
   wherein the pin comprises a head and a core with a free end, and at least two annular snap-fitting beads sequentially arranged at the free end and are configured to pass through the cylindrical protrusion of the cross-member end opening and the cylindrical protrusion of the support column cross-wall opening in snap-fit manner creating a demountable snap-fit.

2. The training device according to claim 1, wherein the pin includes a longitudinal cut formed in the core of the pin and extending from the free end of the pin through a section of the core where the annular snap-fitting beads are located.

3. The training device according to claim 2, wherein the pin includes a longitudinal cut of the pin at the free end of the pin comprises a cross-bar formed between two surfaces of the longitudinal cut connecting thereof.

4. The training device according to claim 1, wherein each of the cross-member includes a deepening defined at the end thereof and is configured for receiving the support column, and wherein a circumference of a base of the deepening defines at least three ribs for mating with the circumference of an upper end of the support column.

5. The training device according to claim 1, wherein the annular step of the cylindrical protrusion of the cross-member end opening forms the end opening with two different diameters, where the end opening of a smaller diameter is allocated towards the end circumference of the end opening and adapted for free passage of the snap-fitting beads of the pin, but not for the head of the pin, wherein the end opening of a bigger diameter is adapted for receiving and supporting the head of the pin.

6. The training device according to claim 1, wherein the inner surface of the cylindrical protrusion of the support column cross-wall opening is conically narrowed towards the end circumference of the cylindrical protrusion, so that, by pushing the pin with a snap-fitting beads through it, the demountable snap-fit is formed.

7. The training device according to claim 1, wherein the end circumference of the cylindrical protrusion of the cross-member end opening is protruded to such a distance, that in assembled state, when the end circumference is supported on the annular step of the cylindrical protrusion of the support column, there is a gap between the cross-member and the support column.

8. The training device according to claim 1, wherein the end circumference of the cylindrical protrusion of the cross-member end opening is protruded to such a distance, that in assembled state, when the end circumference is supported on the annular step of the cylindrical protrusion of the cross-member positioned below, there is a gap between the upper and lower cross-members.

9. The training device according to claim 1, wherein the cross-member, the support column and the pin are made of plastic.

10. The training device according to claim 1, wherein the cross-member, the support column and the pin each separately are made as a single-piece members.

* * * * *